United States Patent [19]

Debize

[11] Patent Number: 5,347,398
[45] Date of Patent: Sep. 13, 1994

[54] OPTICAL SYSTEM FOR FORMING AN IMAGE OF A PLANE ON A SPHERICAL SURFACE

[75] Inventor: Jacques Debize, Saint Heand, France

[73] Assignee: Essilor International Cie Generale D'Optique, Creteil Cedex, France

[21] Appl. No.: 1,551

[22] Filed: Jan. 6, 1993

[30] Foreign Application Priority Data

Jan. 20, 1992 [FR] France ................................ 92 00530

[51] Int. Cl.⁵ .......................... G02B 9/64; G02B 1/04; G02B 1/12
[52] U.S. Cl. ................................ 359/648; 359/679; 359/755
[58] Field of Search ................................ 359/648, 679

[56] References Cited

U.S. PATENT DOCUMENTS 4,909,818  3/1990  Jones ........................... 351/160 R X
5,172,143 12/1992  Baude et al. ...................... 351/177

FOREIGN PATENT DOCUMENTS 0369561  5/1990  European Pat. Off. .
0439394  7/1991  European Pat. Off. .
2150312  6/1985  United Kingdom .

Primary Examiner—Edward K. Look
Assistant Examiner—Michael S. Lee
Attorney, Agent, or Firm—Young & Thompson

[57] ABSTRACT

An optical system is adapted to conjugate an object plane with an image spherical dome whose radius is less than its focal length and whose exit dioptric is a spherical dome on which the image spherical dome is substantially superimposed. The optical system can be used in an exposure device for modifying by physical-chemical treatment the power profile of an artificial optical lens made from a photopolymerizable material. The device comprises a source of radiation and between the source of radiation and the artificial optical lens to be irradiated a mask adapted to modulate the energy flux spatially. The exposure device comprises a curved field lens system formed by the optical system.

25 Claims, 1 Drawing Sheet

OPTICAL SYSTEM FOR FORMING AN IMAGE OF A PLANE ON A SPHERICAL SURFACE

BACKGROUND OF THE INVENTION

1. Field of the Invention

The present invention concerns an optical system adapted to conjugate an object plane with an image spherical surface, in other words an optical system adapted to project or form a spherical image of an object plane.

It also concerns an exposure device having a lens system comprising such an optical system.

2. Description of the Prior Art

To modify by physical-chemical treatment the power profile of an artificial optical lens made from, for example, a photopolymerizable material it has been proposed in U.S. Pat. No. 5,172,143 to expose the artificial optical to a source of radiation through a mask adapted to modulate the energy flux spatially.

The surface to be irradiated being curved, it is normally necessary to allow for its curvature in the mask to be used.

This proves to be difficult to achieve in practice and does not lend itself satisfactorily to industrial implementation.

The present invention is directed to obviating this problem.

SUMMARY OF THE INVENTION

The invention proposes to dispose between the mask and the artificial optical lens to be irradiated an optical system comprising plural optical elements adapted to project an object plane, here a mask, as spherical image which in the present case is usually formed by the rear surface of an artificial optical lens.

It is known in some film projection devices to employ a lens system adapted to project an object plane, in this case an image of the frame of the film, as a spherical image surface on a spherical screen. The screen in such devices has a radius substantially greater than the focal length of the lens system.

The optical system of the lens system would be unsuitable for an exposure device for a photosensitive artificial optical lens.

It is also known in some exposure devices to project an object plane as spherical image surface whose radius is less than its focal length.

This poses the problem of holding the artificial optical lens to be irradiated. The optical system in accordance with the invention provides a very simple solution to this problem.

The output dioptric or refractive interface of the present optical system is a spherical surface on which the spherical image is substantially superimposed.

The output dioptric or refractive interface may thus advantageously constitute a support for the artificial optical lens to be irradiated.

The features and advantages of the invention will emerge from the following description, given by way of example, with reference to the appended diagrammatic drawings.

DETAILED DESCRIPTION OF THE INVENTION

Figure 1:
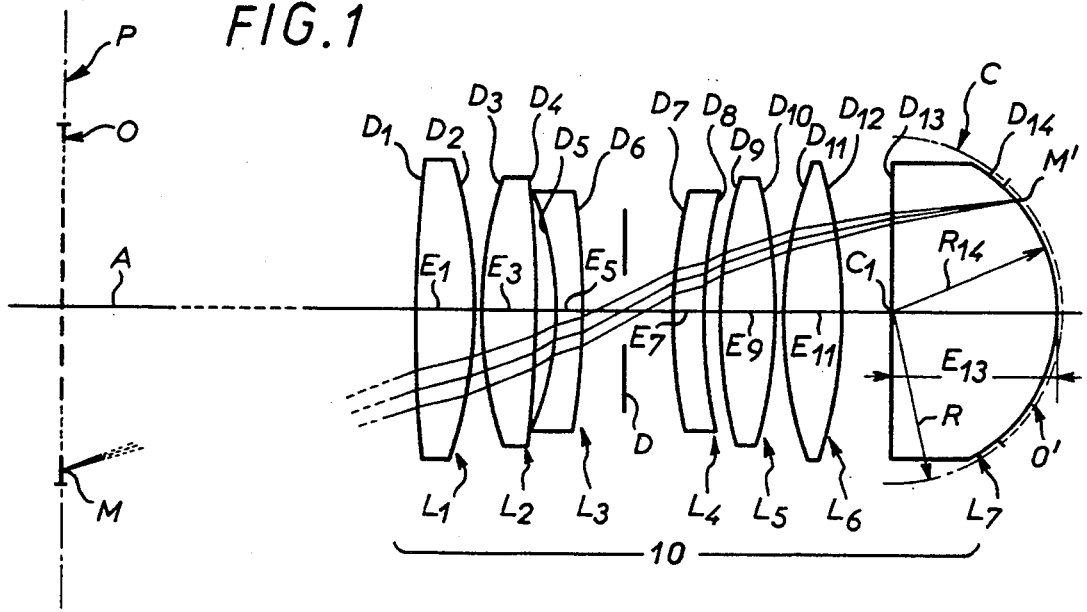
FIG. 1 is a block diagram of an optical system in accordance with the invention.

As shown in FIG. 1, the overall aim is to project an object plane P as a spherical image C.

The optical system 10 used for this purpose is such that the radius R of the spherical image C is less than the focal length F of the optical system.

To be more explicit, the absolute value of the radius R of the spherical image C is at most in the order of one-half the focal length F of the optical system. In practice it is less than one-half the focal length of the optical system.

This optical system 10 in accordance with the invention comprises a succession of 14 spherical dioptric or refractive interfaces D1, D2, D3, ... D14 disposed along an optical axis and having respecting radii R1, R2, R3, ... R14 defined by seven separate lenses L1, L2, L3, ... L7 having a common axis A.

The first lens L1 and the second lens L2 are biconvex convergent lenses.

The third lens L3 and the fourth lens L4 are meniscal divergent lenses.

The fifth lens L5 and the sixth lens L6 are biconvex convergent lenses.

The seventh lens L7 is a plano-convex convergent lens.

The entry dioptric or refractive interface D5 of the third lens L3 is concave and its exit dioptric or refractive interface D6 is convex. The entry dioptric or refractive interface D7 of the fourth lens L4 is convex and its exit dioptric or refractive interface D8 is concave.

In other words, the convex surfaces of meniscal divergent third and fourth lenses L3 and L4 face each other.

A diaphragm D defining a pupil of the lens system is disposed between lenses L3 and L4.

The entry dioptric or refractive interface D13 of the seventh lens L7 is planar and its exit dioptric or refractive interface D14 is convex.

The exit dioptric or refractive interface D14 forms the exit dioptric or refractive interface of the lens system and is a spherical surface on which the spherical image C is substantially superimposed.

The center C1 of the exit dioptric or refractive interface D14 is on the preceding plane dioptric or refractive interface D13.

In other words, the radius R14 of the exit dioptric or refractive interface D14 of the seventh lens L7 is substantially equal to its axial thickness E13.

The absolute value of the radius R1 of the first dioptric or refractive interface D1 is preferably substantially equal to the sum of the radii R3, R4, R5 of the third, fourth and fifth dioptric or refractive interfaces D3, D4, D5, the radius R2 of the second dioptric or refractive interface D2 is substantially equal to half the radius R7 of the seventh dioptric or refractive interface D7, the radius R2 of the second dioptric or refractive interface D2 is substantially equal to three times the radius R14 of the fourteenth dioptric or refractive interface D14, the radius R14 of the fourteenth dioptric or refractive interface D14 is substantially equal to the sum of the radii R2, R3 of the second and third dioptric or refractive interfaces D2, D3 the radius R7 of the seventh dioptric or refractive interface D7 substantially equal to from five times the radius R14 of the fourteenth dioptric or refractive interface D14, the radii R9, R10 of the ninth and tenth dioptric or refractive interfaces D9, D10 are substantially equal and the radii R11, R12 of the eleventh and twelfth dioptric or refractive interfaces D11, D12 are substantially equal.

This being so, and as shown diagrammatically in FIG. 1 by the thin lines representing light rays, any point M on a plane object O situated in the object plane P has a conjugate point M' on an image O' which, as required, lies on the spherical image C. There is given hereinafter by way of example one geometrical formulation of the optical system 10 which is particularly satisfactory:

| | |
|---|---|
| R1 = 87.980 | E1 = 3.200 |
| R2 = −27.530 | E2 = .160 |
| R3 = 21.430 | E3 = 3.200 |
| R4 = −49.380 | E4 = .800 |
| R5 = −17.380 | E5 = 1.600 |
| R6 = −53.820 | E6 = 4.800 |
| R7 = 45.000 | E7 = 1.600 |
| R8 = 23.150 | E8 = .800 |
| R9 = 28.500 | E9 = 3.200 |
| R10 = −28.500 | E10 = .160 |
| R11 = 24.060 | E11 = 3.200 |
| R12 = −24.060 | E12 = 2.700 |
| R13 = ∞ | E13 = 9.000 |
| R14 = −9.010 | |

In this geometrical formulation, expressed in millimeters:

R1 is the radius of the first dioptric or refractive interface D1,

R2 is the radius of the second dioptric or refractive interface D2,

R3 is the radius of the third dioptric or refractive interface D3,

R4 is the radius of the fourth dioptric or refractive D4,

R5 is the radius of the fifth dioptric or refractive interface D5,

R6 is the radius of the sixth dioptric or refractive interface D6,

R7 is the radius of the seventh dioptric or refractive interface D7,

R8 is the radius of the eighth dioptric or refractive interface D8,

R9 is the radius of the ninth dioptric or refractive interface D9,

R10 is the radius of the tenth dioptric or refractive interface D10,

R11 is the radius of the eleventh dioptric or refractive interface D11,

R12 is the radius of the twelfth dioptric or refractive interface D12,

R13 is the radius of the thirteenth dioptric or refractive interface D13,

R14 is the radius of the fourteenth dioptric or refractive interface D14,

E1 is the axial distance between the first and second dioptric or refractive interfaces D1, D2, E2 is the axial distance between the second and third dioptric or refractive interfaces D2, D3, E3 is the axial distance between the third and fourth dioptric or refractive interfaces D3, D4, E4 is the axial distance between the fourth and fifth dioptric or refractive interfaces D4, D5, E5 is the axial distance between the fifth and sixth dioptric or refractive interfaces D5, D6, E6 is the axial distance between the sixth and seventh dioptric or refractive interfaces D6, D7, E7 is the axial distance between the seventh and eighth dioptric or refractive interfaces D7, D8, E8 is the axial distance between the eighth and ninth dioptric or refractive interfaces D8, D9, E9 is the axial distance between the ninth and tenth dioptric or refractive interfaces D9, D10, E10 is the axial distance between the tenth and eleventh dioptric or refractive interfaces D10, D11, E11 is the axial distance between the eleventh and twelfth dioptric or refractive interfaces D11, D12, E12 is the axial distance between the twelfth and thirteenth dioptric or refractive interfaces D12, D13, and E13 is the axial distance between the thirteenth and fourteenth dioptric or refractive interfaces D13, D14, In other words, E1 is the thickness of the first lens L1, E3 is the thickness of the second lens L2, E5 is the thickness of the third lens L3, E7 is the thickness of the fourth lens L4, E9 is the thickness of the fifth lens L5, E11 is the thickness of the sixth lens L6 and, as already mentioned, E13 is the thickness of the seventh lens L7, all these thicknesses E1, E3, E5, E7, E9, E11 and E13 being axial thicknesses, that is thicknesses along the axis A.

The lenses L1, L2, L5, L6 and L7 are made from a material whose refractive index $n_d$ for a spectral line "d" of wavelength $\lambda_d$ is equal to 1.51680 and whose constringence $\nu_d$ is equal to 64.2.

The lenses L3 and L4 are made from a material whose refractive index $n_d$ is equal to 1.67270 and whose constringence $\nu_d$ is equal to 32.2.

Given these conditions and for a wavelength $\lambda_d$ of the spectral line "d" equal to 587.6 nm, the focal length F of the optical system 10 is 18.431 mm.

The optical system 10 is achromatic, such that it is usable at all wavelengths of the visible and ultraviolet spectrum, and in particular wavelengths between 365 and 400 nm.

The transverse magnification is equal to $-1/5$. Given this magnification and the intended object distance, which is in the order of 75 mm, the axis A, the plane object O and the light rays from the point M thereon have been deliberately shortened in FIG. 1.

Figure 2:
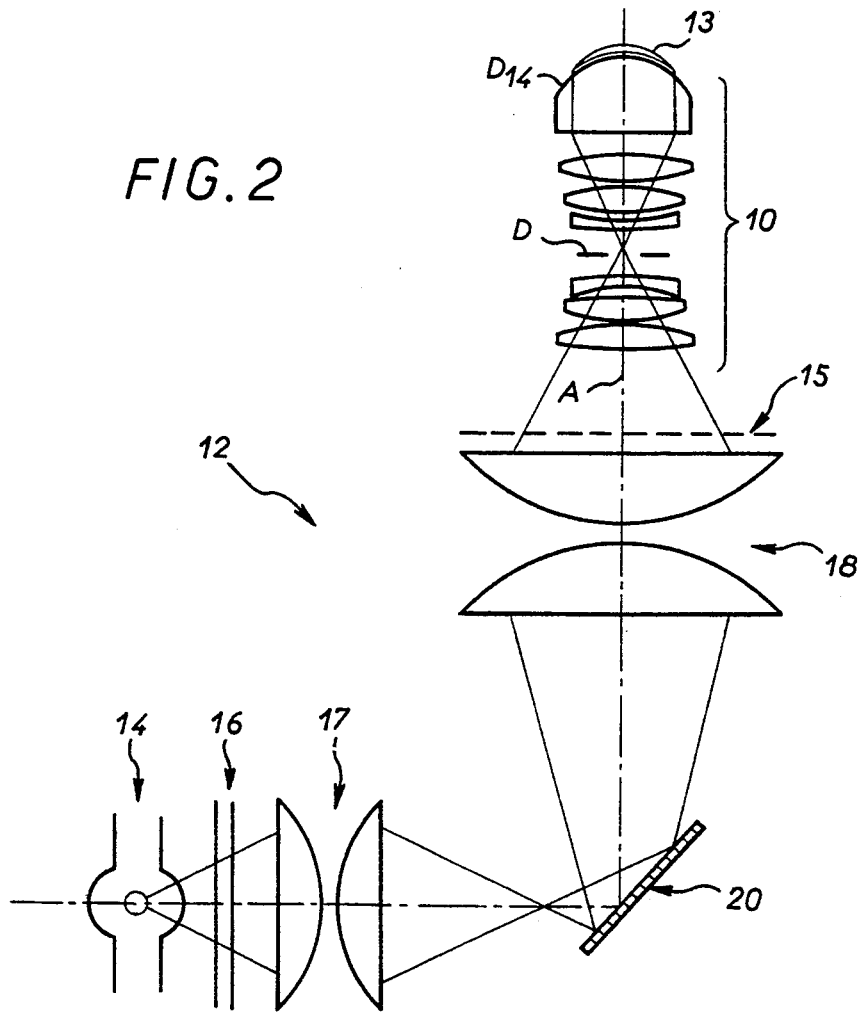
FIG. 2 is a block diagram of an exposure device using this optical system.

FIG. 2 shows, by way of example, the application of the invention to the construction of an exposure device 12 for modifying by physical-chemical treatment the power profile of an artificial ophthalmic lens 13 made from a photopolymerizable material by the aforementioned method disclosed in U.S. Pat. No. 5,172,143. It comprises a source of radiation 14 and, between the radiation source 14 and the artificial optical lens 13 to be irradiated, a mask 15 adapted to modulate the energy flux spatially.

The exposure device 12 further comprises between the mask 15 and the artificial optical lens 13 to be irradiated a curved field imaging lens system formed by an optical system 10 of the type previously described.

The radiation source 14 is an ultraviolet lamp, for example.

It is followed by a high-pass filter 16 which eliminates all unwanted spectral lines.

The emergent radiation is further shaped by two condensers 17, 18 in series which focus the image of the radiation source 14 in the plane of the pupil formed by the diaphragm D of the optical system 10 forming the downstream curved field lens system.

A mirror 20 is disposed between the two condensers 17, 18.

The axis A of the optical system 10 may therefore be vertical.

The mask 15 comprises a rotating mask in the form of a photographic plate glued to a mount and is disposed on the downstream side of the second condenser 18.

Because the curved field imaging lens system (given its focal length) must be kept at a constant distance from the mask 15, the curved field imaging lens system and the mask 15 are advantageously mounted on a common support (not shown).

The artificial optical lens 13 to be irradiated is placed directly on the exit dioptric or refractive interface D14 of the uppermost lens of the optical system 10.

In other words, the exit dioptric or refractive interface D14 is advantageously used as a support for the artificial optical lens 13.

The exit dioptric or refractive interface D14 is part of the seventh lens L7, which may therefore be damaged. The seventh lens L7 therefore preferably constitutes a removable subsystem independent of the remainder of the optical system 10 so that it is easy to replace.

The depth of field of the optical system 10 is in the order of 0.15 mm, more than sufficient to allow for the thickness of the artificial optical lens 13 to be irradiated, which is usually less than 0.1 mm.

The power profile of the artificial optical lens 13 is therefore modified exactly as required.

Of course, the present invention is not limited to the embodiment described and shown but encompasses any variant execution thereof.

Specifically, although the foregoing description relates more particularly to the case in which a spherical image is formed from an object plane, it goes without saying that, conversely, the optical system in accordance with the invention could be used to forme a plane image from a spherical object.

Furthermore, applications of the optical system in accordance with the invention are not limited to exposure devices of the type specifically described and shown, but more generally extend to any other device of which it is adapted to form part.

There is claimed:

1. Optical system for projecting an image of an object plane on a spherical surface, said optical system comprising plural optical elements in optical alignment with a spherical exit dioptric or refractive interface, said plural optical elements be configured to form the spherical image of the object plane substantially superimposed on said spherical interface, said spherical interface having a radius less than the focal length of the optical system, a dioptric or refractive interface of said plural optical elements immediately preceding the exit dioptric or refractive interface being planar.

2. Optical system for projecting an image of an object plane on a spherical surface, said optical system comprising plural optical elements in optical alignment and having a spherical exit dioptric or refractive interface, said plural optical elements be configured to form the spherical image of the object plane substantially superimposed on said spherical interface, said spherical interface having a radius less than the focal length of the optical system.

3. Optical system according to claim 2 wherein the absolute value of the radius of the spherical dioptric or refractive interface is at most in the order of one-half of the focal length of the optical system.

4. Optical system according to claim 2 wherein the absolute value of the radius of the spherical interface is less than one-half the focal length of the optical system.

5. Optical system according to claim 2 wherein the exit dioptric or refractive interface is a convex spherical surface whose center is on the preceding dioptric or refractive interface.

6. Optical system according to claim 2 wherein said spherical exit dioptric or refractive interface is convex.

7. Optical system for projecting an image of an object plane on a spherical surface, said optical system comprising plural optical elements in optical alignment with a spherical exit dioptric or refractive interface, said plural optical elements be configured to form the spherical image of the object plane substantially superimposed on said spherical interface, said spherical interface having a radius less than the focal length of the optical system, said plural optical elements having fourteen spherical dioptric or refractive interfaces.

8. Optical system according to claim 7 comprising in succession a biconvex convergent first lens, a biconvex convergent second lens, a meniscal divergent third lens, a meniscal divergent fourth lens, a biconvex convergent fifth lens, a biconvex convergent sixth lens and a planoconvex convergent seventh lens.

9. Optical system according to claim 8 comprising an entry dioptric or refractive interface of the meniscal divergent third lens which is concave and an exit dioptric or refractive interface which is convex and an entry dioptric or refractive interface of the meniscal divergent fourth lens which is convex and an exit dioptric or refractive interface which is concave.

10. Optical system according to claim 8 comprising a diaphragm defining a pupil disposed between the meniscal divergent third lens and the meniscal divergent fourth lens.

11. Optical system according to claim 8 wherein the absolute value of the radius of the entry or first dioptric or refractive interface is substantially equal to the sum of the radii of the third, fourth and fifth dioptric or refractive interfaces.

12. Optical system according to claim 8 wherein the absolute value of the radius of the second dioptric or refractive interface is substantially equal to one-half the radius of the seventh dioptric or refractive interface.

13. Optical system according to claim 8 wherein the absolute value of the radius of the second dioptric or refractive interface is substantially equal to three times the radius of the fourteenth dioptric or refractive interface.

14. Optical system according to claim 8 wherein the absolute value of the radius of the fourth dioptric or refractive interface is substantially equal to the sum of the radii of the second and third dioptric or refractive interfaces.

15. Optical system according to claim 8 wherein the radius of the seventh dioptric or refractive interface is substantially equal to five times the radius of the fourteenth dioptric or refractive interface.

16. Optical system according to claim 8 wherein the radii of the ninth and tenth dioptric or refractive interfaces are substantially equal.

17. Optical system according to claim 8 wherein the radii of the eleventh and twelfth dioptric or refractive interfaces are substantially equal.

18. Optical system according to claim 8 having the following geometrical formulation expressed in millimeters:

| | |
|---|---|
| R1 = 87.980 | E1 = 3.200 |
| R2 = −27.530 | E2 = .160 |
| R3 = 21.430 | E3 = 3.200 |
| R4 = −49.380 | E4 = .800 |
| R5 = −17.380 | E5 = 1.600 |
| R6 = −53.820 | E6 = 4.800 |
| R7 = 45.000 | E7 = 1.600 |
| R8 = 23.150 | E8 = .800 |
| R9 = 28.500 | E9 = 3.200 |
| R10 = −28.500 | E10 = .160 |
| R11 = 24.060 | E11 = 3.200 |
| R12 = −24.060 | E12 = 2.700 |
| R13 = ∞ | E13 = 9.000 |
| R14 = −9.010 | | in which:

R1 is the radius of the first dioptric or refractive interface D1,

R2 is the radius of the second dioptric or refractive interface D2,

R3 is the radius of the third dioptric or refractive interface D3,

R4 is the radius of the fourth dioptric or refractive interface D4,

R5 is the radius of the fifth dioptric or refractive interface D5,

R6 is the radius of the sixth dioptric or refractive interface D6,

R7 is the radius of the seventh dioptric or refractive interface D7,

R8 is the radius of the eighth dioptric or refractive interface D8,

R9 is the radius of the ninth dioptric or refractive interface D9,

R10 is the radius of the tenth dioptric or refractive interface D10,

R11 is the radius of the eleventh dioptric or refractive interface D11,

R12 is the radius of the twelfth dioptric or refractive interface D12,

R13 is the radius of the thirteenth dioptric or refractive interface D13,

R14 is the radius of the fourteenth dioptric or refractive interface D14,

E1 is the axial distance between the first and second dioptric or refractive interfaces D1, D2, E2 is the axial distance between the second and third dioptric or refractive interfaces D2, D3, E3 is the axial distance between the third and fourth dioptric or refractive interfaces D3, D4, E4 is the axial distance between the fourth and fifth dioptric or refractive interfaces D4, D5, E5 is the axial distance between the fifth and sixth dioptric or refractive interfaces D5, D6, E6 is the axial distance between the sixth and seventh dioptric or refractive interfaces D6, D7, E7 is the axial distance between the seventh and eighth dioptric or refractive interfaces D7, D8, E8 is the axial distance between the eighth and ninth dioptric or refractive interfaces D8, D9, E9 is the axial distance between the ninth and tenth dioptric or refractive interfaces D9, D10, E10 is the axial distance between the tenth and eleventh dioptric or refractive interfaces D10, D11, E11 is the axial distance between the eleventh and twelfth dioptric or refractive interfaces D11, D12, E12 is the axial distance between the twelfth and thirteenth dioptric or refractive interfaces D12, D13, and E13 is the axial distance between the thirteenth and fourteenth dioptric or refractive interfaces D13, D14.

19. Optical system according to claim 18 wherein the first, second, fifth, sixth and seventh lenses are made from a material having a refractive index $n_d$ for a spectral line d of wavelength $\lambda_d$ equal to 1.51680 and constringence $v_d$ equal to 64.2, and the third and fourth lenses are made from a material having a refractive index $n_d$ for a spectral line d of wavelength $\lambda_d$ equal to 1.67270 and constringence $v_d$ equal to 32.2.

20. Exposure device for modifying, by physical-chemical treatment, the power profile of an artificial optical lens made of a photopolymerizable material, said exposure device comprising a source of radiation and a mask adapted to modulate spatially the energy flux of the source of radiation, and an optical system disposed between said source of radiation and said mask, said optical system for projecting an image of an object plane on a spherical surface, said optical system comprising plural optical elements in optical alignment with a spherical exit dioptric or refractive interface, said plural optical elements be configured to form the spherical image of the object plane substantially superimposed on said spherical interface, said spherical interface having a radius less than the focal length of the optical system.

21. Exposure device according to claim 20 wherein the dioptric or refractive exit interface of the optical system defines means for supporting the artificial optical lens to be irradiated.

22. Exposure device according to claim 21 wherein said plural optical elements comprises a plurality of lenses, the downstream-most lens of said plurality of relative to the direction of propagation of said source of radiation being removably mounted.

23. Exposure device according to claim 20 further comprising a common support for supporting said optical system and said mask associated therewith.

24. Exposure device according to claim 20 wherein said spherical exit dioptric or refractive interface is convex.

25. Exposure device according to claim 20 wherein said optical system has a vertical axis and the spherical exit interface is formed on the upper surface of the uppermost optical element of said plural optical element.

* * * * *